United States Patent
Hayakawa et al.

(10) Patent No.: US 6,342,281 B2
(45) Date of Patent: Jan. 29, 2002

(54) HEAT-SHRINKABLE POLYESTER FILMS

(75) Inventors: Satoshi Hayakawa; Hideto Ohashi; Norimi Tabota, all of Inuyama; Maki Sato; Chikao Morishige, both of Ohtsu, all of (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/769,259

(22) Filed: Jan. 26, 2001

(30) Foreign Application Priority Data

Jan. 28, 2000 (JP) .......................... 2000-020195
Feb. 2, 2000 (JP) .......................... 2000-025101

(51) Int. Cl.$^7$ .............................................. B32B 27/00
(52) U.S. Cl. ................... 428/35.2; 428/34.9; 428/35.5; 428/327; 428/332; 528/295.3
(58) Field of Search ............................. 428/34.9, 35.2, 428/35.5, 327, 332; 528/295.3

(56) References Cited

U.S. PATENT DOCUMENTS 5,458,965 A * 10/1995 Yoshinaka et al. .......... 428/323
6,086,989 A * 7/2000 Kubo et al. ................. 428/335
6,153,276 A * 11/2000 Oya et al. .................. 428/35.2

FOREIGN PATENT DOCUMENTS

JP        9-272150       10/1997

* cited by examiner

*Primary Examiner*—Samuel A. Acquah
(74) *Attorney, Agent, or Firm*—Morrison & Foerster LLP

(57) ABSTRACT

Heat-shrinkable polyester films suitable for label use, wherein the value of tan δ for dynamic viscoelasticity in a main shrinkage direction of the film is 0.15 or higher at 65° C. and takes a maximum of 0.40 or higher at a temperature of 65° C. to 100° C. both inclusive, and the heat shrinkability in the main shrinkage direction of the film after treatment in hot water at 80° C. for 10 seconds is 30% or higher, have excellent shrinkage characteristics over a wide range of temperature extending from low temperatures to high temperatures, particularly in the low temperature range, which may cause only rare occurrence of shrinkage spots, wrinkles, strains, longitudinal sinking, and other defects during heat shrinkage, and which may further have excellent break resistance.

6 Claims, No Drawings

HEAT-SHRINKABLE POLYESTER FILMS

FIELD OF INVENTION

The present invention relates to heat-shrinkable polyester films, and more particularly, to heat-shrinkable polyester films suitable for label use, which may cause only rare occurrence of shrinkage spots, wrinkles, strains, longitudinal sinking, and other defects during heat shrinkage, and which may further have excellent break resistance.

BACKGROUND OF THE INVENTION

In the past, heat-shrinkable films have been widely used for various applications, such as shrink-wrap films, shrinkable labels, and cap seals, by utilization of their property of causing shrinkage by heating. In particular, heat-shrinkable stretched films made of vinyl chloride resins, polystyrene resins, polyester resins, or other resins have been used as labels on various vessels, such as polyethylene terephthalate (PET) vessels, polyethylene (PE) vessels, and glass vessels.

However, vinyl chloride resins have serious problems including low heat resistance and evolution of hydrogen chloride gas in their incineration. In addition, when heat-shrinkable films of vinyl chloride resins are used as shrinkable labels on PET and other vessels, the labels should be separated from the vessels in the process of recycling the vessels.

In contrast, films of polystyrene resins or polyester resins cause no evolution of harmful substances such as hydrogen chloride gas in their incineration, and therefore, these films have been expected to take the place of vinyl chloride resin films as shrinkable labels on vessels.

However, polystyrene resin films, although they exhibit good shrinkage finish in appearance after shrunk, have poor solvent resistance, so that they require the use of special ink in their printing. They also have serious problems in their disposal, e.g., they require incineration at high temperatures, in which case they may cause evolution of black smoke and bad smell in large quantities.

As materials that can solve the above problems, polyester resin films have been extremely expected to serve, and there has been a steady increase in their amounts for use. The conventional heat-shrinkable polyester films as described above, however, cannot have satisfactory heat-shrinkage characteristics. More particularly, they easily cause the occurrence of shrinkage spots or wrinkles during heat shrinkage, and they further have some serious problems, when used for covering the bodies of vessels such as PET bottles, PE bottles, and glass bottles, and then shrunk, including distortion of letters or patterns after the shrinkage, which have been previously printed on the films before the shrinkage, and further including insufficient adhesion of the films to the vessels. In addition, they have poor shrinkability as compared with heat-shrinkable polystyrene films, so that they should be shrunk at higher temperatures to attain the desired degree of shrinkage, which further causes serious problems including the deformation of bottles and the occurrence of whitening.

In general, when heat-shrinkable films are used for covering vessels and then shrunk on a large scale for industrial production, there has been a method in which the films formed into labels, tubes, bags, or other shapes are fitted on the vessels, and then allowed to pass, while being carried on a belt conveyor, through a shrinkage tunnel of such a type that the films are heat shrunk by steam blowing (i.e., steam tunnel) or a shrinkage tunnel of such a type that the films are heat shrunk by hot air blowing (i.e., hot air tunnel). The efficiency of heat transmission in the steam tunnel is higher than that in the hot air tunnel, and therefore, the use of a steam tunnel can result in heat shrinkage with higher uniformity to give good shrinkage finish as compared with the use of a hot air tunnel. However, the conventional heat-shrinkable polyester films as described above are inferior in shrinkage finish after shrunk through a steam tunnel to heat-shrinkable vinyl chloride resin films and heat-shrinkable polystyrene resin films. On the other hand, the irregularity of internal film temperature easily occurs during heat shrinkage through a hot air tunnel. As a result, in particular, there easily occur shrinkage spots, wrinkles, strains, and other defects. For this reason, the conventional heat-shrinkable polyester films as described above are also inferior in shrinkage finish after shrunk through a hot air tunnel to heat-shrinkable vinyl chloride resin films and heat-shrinkable polystyrene resin films.

SUMMARY OF THE INVENTION

Under these circumstances, the present inventors have extensively studied to provide heat-shrinkable polyester films suitable for label use, which have excellent shrinkage characteristics over a wide range of temperature extending from low temperatures to high temperatures, particularly in a low temperature range, which may cause only rare occurrence of shrinkage spots, wrinkles, strains, longitudinal sinking, and other defects during heat shrinkage, and which may further have excellent break resistance. As a result, they have found that such heat-shrinkable polyester films can be obtained by the control of dynamic viscoelasticity and heat shrinkability after treatment in hot water.

Thus the present invention provides heat-shrinkable polyester films wherein the value of tan δ for dynamic viscoelasticity in a main shrinkage direction of the film is 0.15 or higher at 65° C. and takes a maximum of 0.40 or higher at a temperature of 65° C. to 100° C. both inclusive (unless otherwise indicated, the range of numerical values referred to herein includes those at both upper and lower limits), and the heat shrinkability in the main shrinkage direction of the film after treatment in hot water at 80° C. for 10 seconds is 30% or higher.

DETAILED DESCRIPTION OF THE INVENTION

For the heat-shrinkable polyester film of the present invention, the value of tan δ for dynamic viscoelasticity in the main shrinkage direction of the film should be 0.15 or higher, preferably 0.20 or higher, at 65° C.

As used herein, the value of tan δ refers to a value defined by tan δ=G'/G" where G' and G" are storage modulus and loss modulus, respectively, which can be determined by applying sine stress to a sample and measuring the delay of sine strain as the response of the sample.

In the process of industrial production where heat-shrinkable films formed into labels, tubes, or other shapes are fitted on vessels and then heat shrunk through a shrinkage tunnel, the temperature on the surface of the vessels in contact with the heat-shrinkable films, although it may vary with the type of process or vessel used, is generally kept at a temperature of 85° C. or lower. The value of tan δ for dynamic viscoelasticity in the main shrinkage direction of the film at such low temperatures is a factor determining the occurrence of shrinkage spots, wrinkles, strains, and other defects during heat shrinkage. In particular, if the value of tan δ for dynamic viscoelasticity in the main shrinkage direction of the film is 0.15 or higher at 65° C., the process of industrial production where heat-shrinkable films are heat shrunk through a shrinkage tunnel involves only rare occurrence of shrinkage spots, wrinkles, strains, and other defects.

The value of tan δ for dynamic viscoelasticity in the main shrinkage direction of the film may preferably be 0.05 or higher, more preferably 0.10 or higher, at 60° C., in which case the film has particularly excellent shrinkage characteristics at low temperatures and exhibits particularly good shrinkage finish.

In addition, the value of tan δ for dynamic viscoelasticity in the main shrinkage direction of the film should take a maximum at a temperature of 65° C. to 100° C. both inclusive. If the value of tan δ for dynamic viscoelasticity in the main shrinkage direction of the film takes a maximum at a temperature lower than 65° C., the film has deteriorated break resistance at room temperature and comes to easily cause a change in physical properties with the lapse of time. For example, during storage at room temperature for a long time, shrinkability at low temperatures of 70° C. or lower is decreased, which causes a problem that shrinkage finish may become poor. If the value of tan δ for dynamic viscoelasticity in the main shrinkage direction of the film takes a maximum at a temperature of higher than 100° C., shrinkage finish also becomes poor in a low temperature range. The value of tan δ for dynamic viscoelasticity in the main shrinkage direction of the film may preferably take a maximum at a temperature of 65° C. inclusive to 80° C. exclusive, in which case the film has particularly excellent shrinkage characteristics at low temperatures and exhibits particularly good shrinkage finish.

The value of tan δ for dynamic viscoelasticity in the main shrinkage direction of the film should take a maximum of 0.4 or higher. If the maximum value of tan δ is lower than 0.4, the polyester in the film has too high crystallinity to cause whitening phenomenon by partial crystallization during heat shrinkage or to make worse or impossible adhesion between two films with an organic solvent such as tetrahydrofuran, which has been usually carried out in the process of tubing. To attain more stable shrinkage finish in appearance and adhesion with an organic solvent, the value of tan δ for dynamic viscoelasticity in the main shrinkage direction of the film preferably takes a maximum of 0.6 or higher, more preferably 0.8 or higher.

The heat shrinkability in the main shrinkage direction of the film after treatment in hot water at 80° C. for 10 seconds should be 30% or higher. If the heat shrinkability in the main shrinkage direction of the film after treatment in hot water at 80° C. for 10 seconds is lower than 30%, shrinkage finish becomes poor because of insufficient shrinkage. To attain more stable shrinkage finish in appearance, the heat shrinkability in the main shrinkage direction of the film after treatment in hot water at 80° C. for 10 seconds may preferably be 40% or higher, more preferably 50% or higher.

For the heat-shrinkable polyester film of the present invention, the rate of initial break in a direction perpendicular to the main shrinkage direction of the film may preferably be 0%. If the rate of initial break is higher than 0%, the film has deteriorated break resistance. In the shrinkable polyester film, molecules are oriented along the main shrinkage direction, so that the deterioration of break resistance easily causes the occurrence of splitting along the direction of molecular orientation, resulting in a problem that the film may be broken by tension in the process of printing or tubing to decrease the efficiency of process operation.

For the heat-shrinkable polyester film of the present invention, the heat shrinkability in a direction perpendicular to the main shrinkage direction of the film after treatment in hot water at 80° C. for 10 seconds may preferably be 10% or lower. If the heat shrinkability in a direction perpendicular to the main shrinkage direction of the film is higher than 10%, shrinkage finish becomes poor by shrinkage in a direction perpendicular to the main shrinkage direction of the film (i.e., occurrence of longitudinal sinking). To attain more stable shrinkage finish in appearance, the heat shrinkability in a direction perpendicular to the main shrinkage direction of the film after treatment in hot water at 80° C. for 10 seconds may preferably be 7% or lower, more preferably 5% or lower, and still more preferably 2% or lower.

The heat-shrinkable polyester film of the present invention is not particularly limited to any thickness, but it may preferably have a thickness of 10 to 200 μm, more preferably 20 to 100 μm, as shrinkable films for label use.

The heat-shrinkable polyester film of the present invention is made of at least one polyester composed mainly of dicarboxylic acid components such as aromatic dicarboxylic acids, aliphatic dicarboxylic acids, or ester derivatives thereof, and polyhydric alcohol components. In the dicarboxylic acid components, the aromatic dicarboxylic acids may include terephthalic acid, isophthalic acid, naphthalene-1,4- or -2,6-dicarboxylic acid, and 5-sulfoisophthalic acid sodium salt. The aliphatic dicarboxylic acids may include dimer acid, glutaric acid, adipic acid, sebacic acid, azelaic acid, oxalic acid, and succinic acid. The ester derivatives of these dicarboxylic acids may include dialkyl esters and diaryl esters. If necessary, oxycarboxylic acids such as p-oxybenzoic acid, or polycarboxylic acids such as trimellitic anhydride and pyromellitic anhydride may be used in combination with the above dicarboxylic acid components. The polyhydric alcohol components may include alkylene glycols such as ethylene glycol, diethylene glycol, dimer diol, propylene glycol, triethylene glycol, 1,4-butanediol, neopentyl glycol, 1,4-cyclohexanedimethanol, 1,6-hexanediol, 3-methyl-1,5-pentanediol, 2-methyl-1,5-pentanediol, 2,2-diethyl-1,3-propanediol, 1,9-nonanediol, and 1,10-decanediol; ethylene oxide adducts of bisphenol compounds or their derivatives, trimethylol propane, glycerin, pentaerythritol, polyoxytetramethylene glycol, and polyethylene glycol. In place of the polyhydric alcohols, ε-caprolactone can also be used.

The polyester in the heat-shrinkable polyester film of the present invention may preferably contain as a constituent monomer, dimer acid as at least one dicarboxylic acid component or dimer diol as at least one polyhydric alcohol component. The incorporation of dimer acid and/or dimer diol as a constituent monomer(s) of the polyester in the heat-shrinkable polyester film of the present invention makes it possible to increase the value of tan δ for dynamic viscoelasticity at 60° C. in the main shrinkage direction of the film, while keeping the film having good break resistance, which leads to easy control of film characteristics.

In this case, the heat-shrinkable polyester film of the present invention may contain either or both of dimer acid and dimer diol, and the amount of dimer acid or dimer diol contained may usually be 1 to 20 mol %, preferably 1 to 15 mol %, and more preferably 1 to 7 mol %, based on the total amount of carboxylic acid components or polyhydric alcohol components.

The dimer acid or dimer diol is a mixture of components containing as the main components those which have the structures of the formulas:

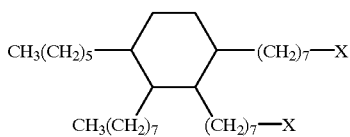

(I)

wherein X is COOH or CH$_2$OH;

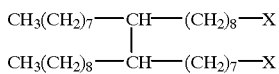

(II)

wherein X is COOH or CH$_2$OH. The ratio of components may preferably be (I):(II)=10:90 to 90:10. The dimer acid and dimer diol may preferably be those which have been washed with water for purification.

The polyester material used in the present invention may be a homopolyester or a mixture of two or more polyesters. The mixture of two or more polyesters may be a mixed system of polyethylene terephthalate and at least one copolyester, or a combination of at least two copolyesters. The copolyester may also be used in combination with polybutylene terephthalate, polycyclohexylene dimethylterephthalate, or other homopolyesters. Mixing of two or more polyesters with different second-order transition temperatures (Tgs) may also be useful for the present invention. Specific examples of the polyester are those composed of terephthalic acid and isophthalic acid as dicarboxylic acid components and ethylene glycol, dimer diol, and polytetramethylene glycol with a molecular weight of 500 to 3000 as polyhydric alcohol components, and these polyesters may be used in a single copolymerized system or in a mixed system of two or more copolymers. These polyesters can be produced by, but not limited to, melt polycondensation according to the ordinary methods. They may also be produced by any other method of polymerization. For polycondensation, various catalysts may be used, such as antimony oxide, germanium oxide, or titanium compounds. The degree of polymerization for the polyester is not particularly limited, but they preferably have an intrinsic viscosity of 0.3 to 1.3 dL/g, more preferably 0.5 to 1.3 dL/g, from the viewpoint of film production.

To the polyester used in the present invention, there may be added for the purpose of preventing coloring and gel formation as well as improving heat resistance, various kinds of metal salts, or phosphoric acid or phosphate esters. The metal salts may include magnesium salts such as magnesium acetate and magnesium chloride, calcium salts such as calcium acetate and calcium chloride, manganese salts such as manganese acetate and manganese chloride, zinc salts such as zinc acetate and zinc chloride, and cobalt salts such as cobalt acetate and cobalt chloride. The total amount of metal salts added, except the above catalyst for polycondensation, may usually be 300 ppm or smaller, as the respective metal ions, relative to the polyester produced. The phosphate esters may include trimethyl phosphate and triethyl phosphate. The total amount of phosphoric acid or phosphate esters added may usually be 200 ppm or smaller, in terms of phosphorous, relative to the polyester produced.

If the total amount of metal ions added, except the above catalyst for polycondensation, is greater than 300 ppm or the total amount of phosphorous is greater than 200 ppm, relative to the polyester produced, the resulting polymer causes remarkable coloring and deterioration in resistance to heat and degradation with river water.

In this case, from the viewpoint of resistance to heat and degradation with river water, the molar atomic ratio of the total amount of phosphorous to the total amount of metal ions is preferably in the range of 0.4 to 1.0. If the molar atomic ratio is smaller than 0.4 or higher than 1.0, the resulting polymer causes remarkable coloring and formation of coarse particle, which is not preferred.

The production of the polyesters used in the present invention is not particularly limited to any process, but it can be carried out by any process of production, including the direct polymerization method in which dicarboxylic acids are directly reacted with glycols and the resulting oligomers are subject to polycondensation; and the transesterification method in which dimethyl esters of dicarboxylic acids and glycols are subjected to transesterification, followed by polycondensation.

The above metal ions, or phosphoric acid or phosphate esters may be added at any step. In general, metal ions may preferably be added when starting materials are placed in a reaction vessel, i.e., before transesterification or esterification, and phosphoric acid or phosphate esters may preferably be added before polycondensation.

To the polyesters in the film of the present invention, there may be added, if necessary, fine particles such as those of silica, titanium dioxide, kaolin, or calcium carbonate, and there may also be added various additives including antioxidants, ultraviolet light absorbers, antistatic agents, coloring agents, and antimicrobial agents.

The value of tan δ for dynamic viscoelasticity at 65° C. in the main shrinkage direction of the film, the temperature at which the value of tan δ takes a maximum, the maximum value of tan δ, and the heat shrinkability in the main shrinkage direction of the film after treatment in hot water at 80° C. for 10 seconds can be controlled within the above ranges by the use of a polyester material(s) in the film as described above or by the control of the conditions of film production as described below, or by a combination of both.

The following will describe a typical process for the production of the heat-shrinkable polyester film of the present invention. Polyester materials which can be used in the present invention are dried using a dryer such as hopper dryer or paddle dryer, or a vacuum dryer, and melt extruded into a film shape at a temperature of 200° C. to 300° C. Alternatively, undried polyester materials are melt extruded into a film shape under the removal of water in an extruder of the vent type. For extrusion, any of the conventional methods can be used, such as T-die method or tubular method. The extrusion and subsequent rapid cooling give an unstretched film, which is then subjected to the process of stretching. To attain the objective of the present invention, the main shrinkage direction of the film may preferably be taken as the transverse direction (i.e., the direction running along the film surface and perpendicular to the direction of extrusion) from a practical point of view. Therefore, the following will describe a typical example of the process of film production in which the main shrinkage direction of the film is taken as the transverse direction. However, the process of film production in which the main shrinkage direction of the film is taken as the machine direction (i.e., the direction of extrusion) can also be carried out substantially in the same manner as described below, except that the direction of stretching is turned 90 degrees around the line perpendicular to the film surface.

The process of stretching in which the main shrinkage direction of the film is taken as the transverse direction may include uniaxial stretching in the transverse direction with a tenter. When a film is stretched in the transverse direction with a tenter, the film should be preheated prior to the step of stretching so that film temperature falls within the range of Tg+0° C. to Tg+60° C. where "Tg" as used herein refers to the second-order transition temperature of a polyesters) in the film.

To attain uniform distribution of thickness in the heat-shrinkable polyester film of the present invention, the step of preheating may preferably be carried out by hot air blowing with a heat transmission coefficient of 0.0013 cal/cm²·sec·° C. (0.0054 J/cm²·sec·K) or lower.

The step of stretching should be carried out at a stretch ratio (or the total stretch ratio, i e., a product of the respective stretch ratios, for multi-stage stretching) of 2.3 to 7.3, preferably 3.8 to 5.2, in the transverse direction at a temperature ranging from Tg+0° C. to Tg+40° C. In the multi-stage stretching, the temperature of the first-stage stretching is preferably set lower than the temperature of preheating.

After the step of stretching or between any two stages in the multi-stage stretching, heat treatment may preferably be carried out under 0% to 15% elongation or relaxation at a temperature of 60° C. to 110° C. If necessary, additional heat treatment may preferably be carried out at a temperature of 40° C. to 100° C.

The process of stretching in which the main shrinkage direction of the film is taken as the transverse direction may include biaxial stretching both in the transverse direction and in the machine direction. The steps of biaxial stretching may be carried out successively or simultaneously, and if necessary, it may be followed by additional stretching. In the successive biaxial stretching, the steps of stretching may be carried out in any order, e.g., in the machine direction and then in the transverse direction, or in the transverse direction and then in the machine direction, or in the machine direction and then in the transverse direction and then again in the machine direction, or in the transverse direction and then in the machine direction and then again in the transverse direction.

The step of stretching in the machine direction may be carried out at a stretch ratio of 1.0 to 2.3, preferably 1.1 to 1.8, and more preferably 1.1 to 1.4, at a temperature of Tg+0° C. to Tg+50° C., preferably Tg+10° C. to Tg+40° C. The stretching in the machine direction makes possible improvement in the break resistance of the heat-shrinkable polyester film. However, if a film is stretched at a stretch ratio of higher than 2.3 in the machine direction, the heat shrinkability in the direction perpendicular to the main shrinkage direction of the film after treatment in hot water at 80° C. for 10 seconds has a tendency to become 10% or higher. Therefore, such conditions for stretching in the machine direction are not preferred for the film production according to the present invention.

For the prevention of heat evolution in the film during stretching to reduce the irregularity of internal film temperature, the step(s) of stretching may preferably be carried out by hot air blowing with a heat transmission coefficient of 0.0009 cal/cm²·sec·° C. (0.0038 J/cm²·sec·K) or higher, preferably 0.0013 to 0.0020 cal/cm²·sec·° C. (0.0054 to 0.0084 J/cm²·sec·).

For example, a particularly preferred process of stretching comprises the following steps in this order:

1) Preheating so that film temperature falls within the range of Tg+0° C. to Tg+60° C. by hot air blowing with a heat transmission coefficient of 0.0013 cal/cm²·sec·° C. (0.0054 J/cm²·sec·K) or lower;

2) First-stage stretching at a stretch ratio of 1.8 to 2.3 in the transverse direction at a temperature ranging from the preheating temperature −30° C. to the preheating temperature −20° C. with a heat transmission coefficient of 0.0009 cal/cm²·sec·° C. (0.0038 J/cm²·sec·K) or higher, in which low temperature stretching and a difference in temperature between the preheating and the first-stage stretching make an increase in the value of tan δ at low temperatures;

3) Heat treatment under 3% to 10% relaxation in the transverse direction at a temperature ranging from the first-stage stretching temperature +3° C. to the first-stage stretching tempereture +5° C.;

4) Second-stage stretching at the total stretch ratio of 3.8 to 4.2 (i.e., a product of the respective stretch ratios in the first-stage stretching and the second-stage stretching) in the transverse direction at a temperature ranging from the first-stage stretching tempereture +5° C. to the first-stage stretching tempereture +10° C. with a heat transmission coefficient of 0.0009 cal/cm²·sec·° C. (0.0038 J/cm²·sec·K), in which high temperature stretching after the heat treatment under relaxation makes a decrease in shrinkage stress and heat shrinkability in the machine direction;

5) Heat treatment under 3% to 8% elongation in the transverse direction at a temperature ranging from the first-stage stretching temperature to the first-stage stretching temperature −5° C., in which the elongation makes an increase in heat shrinkability in the transverse direction.

As described above, the heat-shrinkable polyester film of the present invention can have the desired shrinkage characteristics by a combination of the polyester composition of starting materials in the film production and the process of stretching employed therein.

The heat-shrinkable polyester film of the present invention may have at least one layer, such as an anti-fogging layer, which may be formed on the surface thereof, if necessary.

EXAMPLES

The present invention will be further illustrated by some examples and comparative examples; however, the present invention is not limited to these examples.

The following will describe the methods for measuring some physical properties of films.

(1) Dynamic Viscoelasticity

A film was cut into a strip of 4 cm in length along the main shrinkage direction and 5 mm in width along the direction perpendicular thereto, and the measurement of dynamic viscoelasticity was carried out with this sample using a dynamic viscoelasticity measuring apparatus available from ITK Co., Ltd. under the conditions that measurement length was 3 cm, displacement was 0.25%, and frequency was 10 Hz, in which the value of tan δ at a temperature ranging from 60.0° C. to 60.4° C. was taken as the value of tan δ at 60° C. The value of tan δ was reported as an average of those obtained from two samples.

(2) Heat Shrinkability

A film was cut into a square of 10 cm×10 cm with two sides parallel to the main shrinkage direction and to the direction perpendicular thereto, respectively, and this sample was heat-shrunk by immersion under no load in hot water at 80±0.5° C. for 10 seconds and then measured for side lengths in the main shrinkage direction and in the direction perpendicular thereto, respectively. The heat shrinkability was determined from the side lengths by the following equation:

$$\text{Heat shrinkability} = \frac{\text{Side length before shrinkage} - \text{Side length after shrinkage}}{\text{Side length before shrinkage}} \times 100(\%)$$

(3) Main Shrinkage Direction

A film was measured for heat shrinkability as described above in (2). The direction of a side corresponding to the larger value of heat shrinkability was referred to as the main shrinkage direction.

(4) Shrinkage Finish

A film was printed with three inks of glass, gold and white colors, and into a rectangular of 225 mm in width along the main shrinkage direction and 110 mm in height along the direction perpendicular thereto. This sample was formed into a cylindrical label of 110 mm in height and 110 mm in folding diameter (i.e., length in the width direction when the label was folded flat) by attaching one end to the other in the main shrinkage direction (the width of margins for attachment were 5 mm) with a solvent such as 1,3-dioxolane. The label was fitted on a glass bottle (300 mL) and heat-shrunk by allowing the labeled glass bottle to pass through a shrinkage tunnel with a hot air at 130° C. (air speed, 10 m/sec) for a passage time of 10 seconds. The shrinkage finish was determined by visual observation for the number of shrinkage spots and evaluated at 5 ranks by the following criteria.

rank 5: best finish (no shrinkage spot)
rank 4: good finish (1 shrinkage spot)
rank 3: bad finish (2 shrinkage spots)
rank 2: worse finish (3–5 shrinkage spots)
rank 1: worst finish (6 or more shrinkage spots)

in which ranks 4 and 5 were regarded as acceptable.

(5) Rate of initial break

A film was cut into a strip of 15 mm in width along the main shrinkage direction and 100 mm in length along the direction perpendicular thereto, and this sample was measured for elongation at break in the main shrinkage direction and in the direction perpendicular thereto according to JIS-C-2318. The measurement of elongation at break was carried out for 20 samples (i.e., n=20), and the number (x) of samples exhibiting 5% or smaller elongation at break was determined. The rate of initial break was calculated from the values of x and n by the following equation:

Rate of initial break=$(x/n) \times 100(\%)$

Example 1

In a stainless steel autoclave equipped with a stirrer, a thermometer, and a condenser of the partial reflux type were placed starting materials at a composition of 80 mol % dimethyl terephthalate and 20 mol % dimethyl isophthalate as dicarboxylic acid components and 96 mol % ethylene glycol and 3 mol % dimer diol ("HP-1000" available from Toagosei Chemical Industry Co., Ltd.) as polyhydric alcohol components so that the polyhydric alcohol components were 2.2 times as high in molar ratio as the dicarboxylic acid components, and transesterification was carried out with 0.05 mol % zinc acetate (relative to the acid components) as a catalyst under the removal of methanol by distillation from the system. After that, 1 mol % polytetramethylene glycol with a molecular weight of 650 (relative to the acid components) and 0.025 mol % antimony trioxide (relative to the acid components) as a catalyst were added to cause a polycondensation. This gave a copolyester composed of 80 mol % terephthalic acid and 20 mol % isophthalic acid as dicarboxylic acid components and 96 mol % ethylene glycol, 3 mol % dimer diol and 1 mol % polytetramethylene glycol with a molecular weight of 650 as polyhydric alcohol components. The copolyester thus obtained had an intrinsic viscosity of 0.7 dl/g.

This polyester was melt extruded at 280° C. and then rapidly cooled to give an unstretched film of 180 μm in thickness. The unstretched film was then subjected to stretching at a stretch ratio of 1.15 in the machine direction at 80° C., pre-heating at 103° C. for 8 seconds with a heat transmission coefficient of 0.0011 cal/cm$^2$·sec·° C. (0.0045 J/cm$^2$·sec·K), first-stage stretching at a stretch ratio of 2.0 in the transverse direction at 75° C. with a heat transmission coefficient of 0.0015 cal/cm$^2$·sec·° C. (0.0062 J/cm$^2$·sec·K), heat treatment under 6% relaxation in the transverse direction at 78° C. for 3 seconds, second-stage stretching at the total stretch ratio of 4.0 in the transverse direction at 80° C. with a heat transmission coefficient of 0.0014 cal/cm$^2$·sec·° C. (0.0060 J/cm$^2$·sec·K), and heat treatment under 5% elongation in the transverse direction at 73° C. for 6 seconds gave a heat-shrinkable polyester film of 43 μm in thickness. The main shrinkage direction of the film was corresponding to the transverse direction. The physical properties of the film thus obtained are shown in Table 1.

Example 2

A copolyester composed of 79 mol % terephthalic acid, 15 mol % isophthalic acid and 6 mol % dimer acid ("Prepol 1009" available from Unichema Chemicals, Ltd.) as dicarboxylic acid components and 88 mol % ethylene glycol, 10 mol % neopentyl glycol and 2 mol % polytetramethylene glycol with a molecular weight of 650 as polyhydric alcohol components was prepared by the same method of polymerization as used in Example 1. The copolyester thus obtained had an intrinsic viscosity of 0.72 dL/g.

This polyester was melt extruded at 280° C. and then rapidly cooled to give an unstretched film of 190 μm in thickness. The unstretched film was subjected to stretching at a stretch ratio of 1.20 at 78° C. in the machine direction, pre-heating at 105° C. for 8 seconds with a heat transmission coefficient of 0.0011 cal/cm$^2$·sec·° C. (0.0045 J/cm$^2$·sec·K), first-stage stretching at a stretch ratio of 1.8 in the transverse direction at 75° C. with a heat transmission coefficient of 0.0015 cal/cm$^2$·sec·° C. (0.0062 J/cm$^2$·sec·K), heat treatment under, 5% relaxation at 76° C. for 3 seconds, second-stage stretching at the total stretch ratio of 4.1 in the transverse direction at 80° C. with a heat transmission coefficient of 0.0014 cal/cm$^2$·sec·° C. (0.0060 J/cm$^2$·sec·K), and heat treatment under 5% elongation in the transverse direction at 73° C. for 6 seconds. This gave a heat-shrinkable polyester film of 44 μm in thickness. The main shrinkage direction of the film was corresponding to the transverse direction. The physical properties of the film thus obtained are shown in Table 1.

Comparative Example 1

A copolyester composed of 97 mol % terephthalic acid and 3 mol % isophthalic acid as dicarboxylic acid components and 71.5 mol % ethylene glycol, 28 mol % neopentyl glycol and 0.5 mol % polytetramethylene glycol with a molecular weight of 650 as polyhydric alcohol components was prepared by the same method of polymerization as used in Example 1. The copolyester thus obtained had an intrinsic viscosity of 0.70 dL/g.

This polyester was melt extruded at 280° C. and then rapidly cooled to give an unstretched film of 195 μm in thickness. The unstretched film was subjected to pre-heating at 105° C. for 9 seconds, stretching at a stretch ratio of 4.3 in the transverse direction at 83° C., and heat treatment under no elongation at 75° C. for 10 seconds. This gave a heat-shrinkable polyester film of 45 µm in thickness. The main shrinkage direction of the film was corresponding to the transverse direction. The physical properties of the film thus obtained are shown in Table 1.

Comparative Example 2

A copolyester composed of 92 mol % terephthalic acid and 8 mol % isophthalic acid as dicarboxylic acid components and 77 mol % ethylene glycol and 23 mol % 1,4-butanediol as polyhydric alcohol components was prepared by the same method of polymerization as used in Example 1. The copolyester thus obtained had an intrinsic viscosity of 0.70 dL/g.

This polyester was melt extruded at 280° C. and then rapidly cooled to give an unstretched film of 180 µm in thickness. The unstretched film was subjected to pre-heating at 95° C. for 8 seconds, first-stage stretching at a stretch ratio of 2.3 in the transverse direction at 80° C., second-stage stretching at a stretch ratio of 1.7 in the traverse direction at 85° C., and heat treatment under no elongation at 85° C. for 15 seconds. This gave a heat-shrinkable polyester film of 44 µm in thickness. The main shrinkage direction of the film was corresponding to the transverse direction. The physical properties of the film thus obtained are shown in Table 1.

Comparative Example 3

A copolyester composed of 62 mol % terephthalic acid and 38 mol % isophthalic acid as dicarboxylic acid components and 78 mol % ethylene glycol, 21 mol % butanediol and 1 mol % polytetramethylene glycol with a molecular weight of 650 as polyhydric alcohol components was prepared by the same method of polymerization as used in Example 1. The copolyester thus obtained had an intrinsic viscosity of 0.70 dL/g.

This polyester was melt extruded at 280° C. and then rapidly cooled to give an unstretched film of 180 µm in thickness. The unstretched film was subjected to pre-heating at 90° C. for 8 seconds, first-stage stretching at a stretch ratio of 1.6 in the transverse direction at 80° C., second-stage stretching at a stretch ratio of 2.5 in the traverse direction at 75° C., and heat treatment at 73° C. for 10 seconds. This gave a heat-shrinkable polyester film of 45 µm in thickness. The main shrinkage direction of the film was corresponding to the transverse direction. The physical properties of the film thus obtained are shown in Table 1.

Comparative Example 4

A copolyester composed of 83 mol % terephthalic acid and 17 mol % 2,6-naphthalenedicarboxylic acid as dicarboxylic acid components and 83 mol % ethylene glycol, 15 mol % butanediol and 2 mol % polytetramethylene glycol with a molecular weight of 650 as polyhydric alcohol components was prepared by the same method of polymerization as used in Example 1. The copolyester thus obtained had an intrinsic viscosity of 0.70 dL/g.

This polyester was melt extruded at 280° C. and then rapidly cooled to give an unstretched film of 180 µm in thickness. The unstretched film was subjected to pre-heating at 105° C. for 8 seconds, first-stage stretching at a stretch ratio of 2.5 in the transverse direction at 85° C., second-stage stretching at a stretch ratio of 1.16 in the transverse direction at 90° C., and heat treatment under no elongation at 73° C. for 10 seconds. This gave a heat-shrinkable polyester film of 45 µm in thickness. The main shrinkage direction of the film was corresponding to the transverse direction. The physical properties of the film thus obtained are shown in Table 1.

Example 3

In a stainless steel autoclave equipped with a stirrer, a thermometer, and a condenser of the partial reflux type were placed starting materials at a composition of 28 mol % dimethyl terephthalate and 72 mol % dimethyl naphthalate as dicarboxylic acid components and 88 mol % ethylene glycol and 11 mol % dimer diol ("HP-1000" available from Toagosei Chemical Industry Co., Ltd.) as polyhydric alcohol components so that the polyhydric alcohol components were 2.2 times as high in molar ratio as the dicarboxylic acid components, and transesterification was carried out with 0.05 mol % zinc acetate (relative to the acid components) as a catalyst under the removal of methanol by distillation from the system. After that, 1 mol % polytetramethylene glycol with a molecular weight of 650 (relative to the acid components) and 0.025 mol % antimony trioxide (relative to the acid components) as a catalyst were added to cause a polycondensation. This gave a copolyester composed of 28 mol % terephthalic acid and 72 mol % naphthalenedicarboxylic acid as dicarboxylic acid components and 88 mol % ethylene glycol, 11 mol % dimer diol and I mol % polytetramethylene glycol with a molecular weight of 650 as polyhydric alcohol components. The copolyester thus obtained had an intrinsic viscosity of 0.69 dl/g.

This polyester was melt extruded at 280° C. and then rapidly cooled to give an unstretched film of 180 µm in thickness. The unstretched film was subjected to stretching at a stretch ratio of 1.15 in the machine direction at 80° C. with a heat transmission coefficient of 0.0201 cal/cm²·sec·° C. (0.0837 J/cm²·sec·K), pre-heating at 103° C. for 8 seconds with a heat transmission coefficient of 0.0011 cal/cm²·sec·° C. (0.0045 J/cm²·sec·K), first-stage stretching at a stretch ratio of 2.0 in the transverse direction at 75° C. with a heat transmission coefficient of 0.0015 cal/cm²·sec·° C. (0.0062 J/cm²·sec·K), heat treatment under 6% relaxation in the transverse direction at 78° C. for 3 seconds, second-stage stretching at the total stretch ratio of 4.0 in the transverse direction at 80° C. with a heat transmission coefficient of 0.0014 cal/cm²·sec·° C. (0.0060 J/cm²·sec·K), and heat treatment under 5% elongation in the transverse direction at 73° C. for 6 seconds. This gave a heat-shrinkable polyester film of 43 µm in thickness. The main shrinkage direction of the film was corresponding to the transverse direction. The physical properties of the film thus obtained are shown in Table 1.

Example 4

A copolyester composed of 51 mol % terephthalic acid, 5 mol % isophthalic acid, 35 mol % 2,6-naphthalenedicarboxylic acid and 9 mol % dimer acid ("Prepol 1009" available from Unichema Chemicals, Ltd.) as dicarboxylic acid components and 89 mol % ethylene glycol, 10 mol % neopentyl glycol and 1 mol % polytetramethylene glycol with a molecular weight of 650 as polyhydric alcohol components was prepared by the same method of polymerization as used in Example 3. The copolyester thus obtained had an intrinsic viscosity of 0.70 dL/g.

This polyester was melt extruded at 280° C. and then rapidly cooled to give an unstretched film of 180 µm in thickness. The unstretched film was subjected to stretching at a stretch ratio of 1.20 in the machine direction at 78° C. with a heat transmission coefficient of 0.0201 cal/cm$^2$·sec·° C. (0.0837 J/cm$^2$·sec·K), preheating at 105° C. for 8 seconds with a heat transmission coefficient of 0.0011 cal/cm$^2$·sec·° C. (0.0045 J/cm$^2$·sec·K), first-stage stretching at a stretch ratio of 1.8 in the transverse direction at 75° C. with a heat transmission coefficient of 0.0011 cal/cm$^2$·sec·° C. (0.0045 J/cm$^2$·sec·K), heat treatment 5% relaxation in the transverse direction at 78° C., second-stage stretching at the total stretch ratio of 4.1 in the transverse direction at 80° C. with a heat transmission coefficient of 0.0015 cal/cm$^2$·sec·° C. (0.0062 J/cm$^2$·sec·K), and heat treatment under 5% elongation in the transverse direction at 73° C. for 6 seconds. This gave a heat-shrinkable polyester film of 44 μm in thickness. The main shrinkage direction of the film was corresponding to the transverse direction. The physical properties of the film thus obtained are shown in Table 1.

Example 5

A copolyester composed of 30 mol % terephthalic acid and 70 mol % 2,6-naphthalenedicarboxylic acid as dicarboxylic acid components and 89 mol % ethylene glycol, 10 mol % dimer diol ("HP-1000" available from Toagosei Chemical Industry Co., Ltd.) and 1 mol % polytetramethylene glycol with a molecular weight of 650 as polyhydric alcohol components was prepared by the same method of polymerization as used in Example 3. The copolyester thus obtained had an intrinsic viscosity of 0.70 dL/g.

This polyester was melt extruded at 280° C. and then rapidly cooled to give an unstretched film of 400 μm in thickness. The unstretched film was subjected to stretching at a stretch ratio of 2.3 in the machine direction at 80° C. with a heat transmission coefficient of 0.0201 cal/cm$^2$·sec·° C. (0.0837 J/cm$^2$·sec·K), preheating at 105° C. for 8 seconds with a heat transmission coefficient of 0.0011 cal/cm$^2$·sec.° C. (0.0045 J/cm$^2$·sec·K), first-stage stretching at a stretch ratio of 2.5 in the transverse direction at 85° C. with a heat transmission coefficient of 0.0015 cal/cm$^2$·sec·° C. (0.0062 J/cm$^2$·sec·), heat treatment under 5% relaxation at 88° C., second-stage stretching at a stretch ratio of 1.6 in the transverse direction at 90° C. with a heat transmission coefficient of 0.0016 cal/cm$^2$·sec.° C. (0.0065 J/cm$^2$·sec·K), and heat treatment under 5% elongation in the transverse direction at 75° C. for 10 seconds. This gave a heat-shrinkable polyester film of 43 μm in thickness. The main shrinkage direction of the film was corresponding to the transverse direction. The physical properties of the film thus obtained are shown in Table 1.

Comparative Example 5

A copolyester composed of 100 mol % terephthalic acid as a dicarboxylic acid component and 68 mol % ethylene glycol, 31 mol % neopentyl glycol and 1 mol % polytetramethylene glycol with a molecular weight of 650 as polyhydric alcohol components was prepared by the same method of polymerization as used in Example 3. The copolyester thus obtained had an intrinsic viscosity of 0.70 dL/g.

This polyester was melt extruded at 280° C. and then rapidly cooled to give an unstretched film of 195 μm in thickness. The unstretched film was subjected to preheating at 110° C. for 8 seconds with a heat transmission coefficient of 0.0011 cal/cm$^2$·sec.° C. (0.0045 J/cm$^2$·sec·K), stretching at a stretch ratio of 4.5 in the transverse direction at 83° C. with a heat transmission coefficient of 0.0011 cal/cm$^2$·sec.° C. (0.0045 J/cm$^2$·sec·K), and heat treatment under no elongation at 70° C. for 10 seconds. This gave a heat-shrinkable polyester film of 43 μm in thickness. The main shrinkage direction of the film was corresponding to the transverse direction. The physical properties of the film thus obtained are shown in Table 1.

Comparative Example 6

A copolyester composed of 8 mol % terephthalic acid and 92 mol % 2,6-naphthalenedicarboxylic acid as dicarboxylic acid components and 90 mol % ethylene glycol and 10 mol % 1,4-butanediol as polyhydric alcohol components was prepared by the same method of polymerization as used in Example 3. The copolyester thus obtained had an intrinsic viscosity of 0.68 dL/g.

This polyester was melt extruded at 280° C. and then rapidly cooled to give an unstretched film of 180 μm in thickness. The unstretched film was subjected to preheating at 105° C. for 8 seconds with a heat transmission coefficient of 0.0011 cal/cm$^2$·sec.° C. (0.0045 J/cm$^2$·sec·K), first-stage stretching at a stretch ratio of 2.3 in the transverse direction at 90° C. with a heat transmission coefficient of 0.0011 cal/cm$^2$·sec.° C. (0.0045 J/cm$^2$·sec·K), second-stage stretching at a stretch ratio of 1.7 in the transverse direction at 85° C. with a heat transmission coefficient of 0.0011 cal/cm$^2$·sec.° C. (0.0045 J/cm$^2$·sec·K), and heat treatment under 5% elongation in the transverse direction at 90° C. for 15 seconds. This gave a heat-shrinkable polyester film of 46 μm in thickness. The main shrinkage direction of the film was corresponding to the transverse direction. The physical properties of the film thus obtained are shown in Table 1.

Example 6

A copolyester composed of 78 mol % terephthalic acid and 22 mol % isophthalic acid as dicarboxylic acid components and 81 mol % ethylene glycol, 18 mol % butanediol and 1 mol % polytetramethylene glycol with a molecular weight of 650 as polyhydric alcohol components was prepared by the same method of polymerization as used in Example 3. The copolyester thus obtained had an intrinsic viscosity of 0.67 dL/g.

This polyester was melt extruded at 280° C. and then rapidly cooled to give an unstretched film of 180 μm in thickness. The unstretched film was subjected to preheating at 90° C. for 8 seconds with a heat transmission coefficient of 0.0011 cal/cm$^2$·sec.° C. (0.0045 J/cm$^2$·sec·K), first-stage stretching at a stretch ratio of 1.6 in the transverse direction at 80° C. with a heat transmission coefficient of 0.0015 cal/cm$^2$·sec.° C. (0.0062 J/cm$^2$·sec·K), second-stage stretching at a stretch ratio of 2.5 in the transverse direction at 75° C. with a heat transmission coefficient of 0.0014 cal/cm$^2$·sec.° C. (0.0060 J/cm$^2$·sec·K), and heat treatment under no elongation at 60° C. for 10 seconds. This gave a heat-shrinkable polyester film of 45 μm in thickness. The main shrinkage direction of the film was corresponding to the transverse direction. The physical properties of the film thus obtained are shown in Table 1.

TABLE 1

| | | Tan δ | | | Temperature | Heat shrinkability after treatment in hot water at 80° C. | | Rate of | |
|---|---|---|---|---|---|---|---|---|---|
| | Tg | value at 60° C. | value at 65° C. | maximum value | for maximum value of tan δ | Main direction | Perp. direction | initial break | Shrinkage finish |
| Example 1 | 59 | 0.12 | 0.26 | 0.90 | 76 | 55.0 | −1.0 | 0 | 5 |
| Example 2 | 52 | 0.17 | 0.40 | 0.98 | 72 | 57.5 | 0.0 | 0 | 5 |
| Comp. Ex. 1 | 69 | 0.02 | 0.06 | 0.90 | 85 | 47.0 | −2.0 | 0 | 3 |
| Comp. Ex. 2 | 62 | 0.01 | 0.03 | 0.37 | 77 | 27.0 | 2.0 | 20 | 1 |
| Comp. Ex. 3 | 59 | 0.38 | 0.83 | 0.85 | 63 | 58.5 | −1.0 | 100 | 4 |
| Comp. Ex. 4 | 72 | 0.01 | 0.02 | 0.86 | 95 | 49.5 | 12.5 | 0 | 2 |
| Example 3 | 62 | 0.05 | 0.25 | 0.88 | 95 | 58.5 | −1.5 | 0 | 5 |
| Example 4 | 63 | 0.05 | 0.19 | 0.68 | 87 | 42.5 | 1.5 | 0 | 4 |
| Comp. Ex. 5 | 72 | 0.01 | 0.05 | 0.97 | 89 | 60.0 | −2.0 | 0 | 3 |
| Comp. Ex. 6 | 89 | 0.00 | 0.02 | 0.38 | 97 | 29.0 | 2.0 | 0 | 1 |
| Example 5 | 62 | 0.05 | 0.27 | 0.89 | 95 | 59.5 | 13.5 | 0 | 4 |
| Example 6 | 58 | 0.10 | 0.34 | 0.92 | 69 | 59.5 | −1.0 | 70 | 4 |

The heat-shrinkable polyester films of the present invention exhibit excellent shrinkage finish over a wide range of temperature extending from low temperatures to high temperatures, particularly in the low temperature range, which provides very beautiful appearance with rare occurrence, if any, of shrinkage spots, wrinkles, strains, and other defects. The heat-shrinkable polyester films of the present invention may further have excellent break resistance. Therefore, they can preferably be used for various applications including shrinkable labels, cap seals, and shrink-wrap films.

What is claimed is:

1. A heat-shrinkable polyester film, wherein the value of tan δ for dynamic viscoelasticity in a main shrinkage direction of the film is 0.15 or higher at 65° C. and takes a maximum of 0.40 or higher at a temperature of 65° C. to 100° C. both inclusive, and the heat shrinkability in the main shrinkage direction of the film after treatment in hot water at 80° C. for 10 seconds is 30% or higher.

2. The heat-shrinkable polyester film according to claim 1, wherein the value of tan δ for dynamic viscoelasticity in the main shrinkage direction of the film is 0.05 or higher at 60° C.

3. The heat-shrinkable polyester film according to claim 1, wherein the value of tan δ for dynamic viscoelasticity in the main shrinkage direction of the film takes a maximum of 0.40 or higher at a temperature of 65° C. inclusive to 80° C. exclusive.

4. The heat-shrinkable polyester film according to claim 1, wherein the rate of initial break in a direction perpendicular to the main shrinkage direction of the film is 0%.

5. The heat-shrinkable polyester film according to claim 1, wherein the heat shrinkability in a direction perpendicular to the main shrinkage direction of the film after treatment in hot water at 80° C. for 10 seconds is 10% or lower.

6. The heat-shrinkable polyester film according to claim 1, wherein the film is made of a polyester comprising as a constituent monomer at least one of dimer acid and dimer diol.

* * * * *